US006775234B1

(12) United States Patent
Garcia-Martin

(10) Patent No.: US 6,775,234 B1
(45) Date of Patent: Aug. 10, 2004

(54) TELECOMMUNICATIONS NETWORK CONGESTION

(75) Inventor: Miguel-Angel Garcia-Martin, Madrid (ES)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/560,508

(22) Filed: Apr. 27, 2000

(30) Foreign Application Priority Data

Apr. 30, 1999 (GB) ............................................. 9910026

(51) Int. Cl.⁷ ........................... H04L 12/26; H04M 7/00
(52) U.S. Cl. ................. 370/237; 370/385; 379/221.01; 379/221.05
(58) Field of Search ............................... 370/236, 232, 370/252, 254, 237, 385, 352, 428, 469, 524; 379/230, 219, 220.01, 221.01–221.05, 221.07, 221.08, 221.12; 709/241; 707/3, 10

(56) References Cited

U.S. PATENT DOCUMENTS

| | | | | |
|---|---|---|---|---|
| 4,979,118 A | * | 12/1990 | Kheradpir | 370/252 |
| 5,268,895 A | | 12/1993 | Topper | 370/58.3 |
| 5,583,976 A | | 12/1996 | Bullard, Jr. | 395/140 |
| 5,708,702 A | | 1/1998 | De Paul et al. | 379/230 |
| 5,926,482 A | * | 7/1999 | Christie et al. | 370/524 |
| 5,933,490 A | * | 8/1999 | White et al. | 379/221.01 |
| 5,983,217 A | * | 11/1999 | Khosravi-Sichani et al. | 707/3 |
| 6,122,255 A | * | 9/2000 | Bartholomew et al. | 370/237 |
| 6,137,806 A | * | 10/2000 | Martinez | 379/230 |
| 6,377,674 B1 | * | 4/2002 | Chong et al. | 379/230 |
| 6,608,893 B1 | * | 8/2003 | Fleming et al. | 379/221.01 |

FOREIGN PATENT DOCUMENTS

| | | |
|---|---|---|
| GB | 2305072 | 3/1997 |
| WO | WO 98/51096 | 11/1998 |

OTHER PUBLICATIONS

S. Vercauteren, International Search Report, International App. No. PCT/EP00/03520, Aug. 30, 2000, pp. 1–9.
ITU–T Recommendation Q. 714; *Series Q: Switching and Signalling Specifications of Signalling System No. 7–1 Signalling Connection Control Part—Signalling Connection Control Part Procedures*, XP–002146173, (Jul. 1996), pp. 12–17, pp. 49–61.

* cited by examiner

*Primary Examiner*—Duc Ho
*Assistant Examiner*—Phuongchau Ba Nguyen

(57) ABSTRACT

A method of routing signalling information at a signalling point of a telecommunications network. A Global Title Routing Case (GTRC) table is provided for mapping Global Titles to GTRCs, where each GTRC is allocated a primary and secondary destination signalling point. At least one peak time period is predefined, and said primary and secondary destination signalling points are swapped during said peak period to allow for load sharing during this period. For a signalling transfer request received at the signalling point, the Global Title associated with the request is mapped to a GTRC using the GTRC table, and the destination signalling point is determined in dependence upon the primary and secondary destination signalling points allocated to the mapped GTRC and signalling point availability, and, the time at which the request is received.

18 Claims, 3 Drawing Sheets

TELECOMMUNICATIONS NETWORK CONGESTION

This application claims the benefit of the filing date as provided in 35 U.S.C. 119 of United Kingdom patent application number GB 9910026.5 filed on Apr. 30, 1999, the disclosures of which are incorporated herein by reference.

FIELD OF THE INVENTION

The present invention relates to congestion in a telecommunications network and more particularly to alleviating congestion during the routing of signalling information between signalling points of a telecommunications network.

BACKGROUND TO THE INVENTION

In a modern telecommunications network, a considerable amount of signalling information is continually being exchanged between signalling points of the network. Examples of signalling points are network switches, databases, etc. The actual signalling information being exchanged may be associated with a specific telephone call, e.g. relating to call set-up or termination, or may relate to network management functions. Complex protocols have been created to deal with the exchange of signalling information. In particular, Signalling System no.7 (SS7) defines (subject to certain national/regional variations) a suite of protocol parts (or levels) capable of dealing with modern network signalling demands.

FIG. 1 illustrates schematically the "structure" of SS7 (it will be appreciated that the SS7 parts are generally implemented by means of software running on computer processors). On top of the SS7 stack sit the user and application parts which are the entities which make use of and provide signalling information. For example, an ISDN User Part (ISUP) controls the setting up and control of inter-exchange connections for subscriber calls whilst a Mobile Application Part (MAP) handles database queries in a mobile network (e.g. to determine the current location of a mobile subscriber).

At the bottom of the SS7 is the Message Transfer Part (MTP) which in fact comprises three distinct levels. Level 1 defines the physical, electrical, and functional characteristics of a digital signalling link. MTP level 1 has a number of different possible forms including the European standard E.1 (2048 kb/s and 32 64 kb/s channels). MTP level 2 takes care of the accurate end-to-end transmission of messages across a chosen signalling link, whilst MTP level 3 handles the routing of signalling messages between neighbouring signalling links based upon information received from higher SS7 a levels concerning the final destination of a signalling message. MTP level 3 handles inter alia re-routing of messages away from failed or congested signalling links.

Routing by MTP level 3 is carried out based on a destination signalling point and subsystem number (SSN), provided to the MTP by a higher SS7 layer. In particular, for the Transaction Capabilities Application Part TCAP (which handles database queries for the MAP, INAP etc) a Signalling Connection and Control Part (SCCP) generates the destination signalling point and subsystem number using a process termed "Global Title translation". The SCCP typically carries out a Global Title translation on a Global Title (GT), which may be a dialled Intelligent Network (IN) service number, e.g. an 800 number, a subscriber identification number or the like, using a Global Title Routing Case (GTRC) table. This table contains a mapping between GT series and GTRCs (a GTRC typically being one of an ordered series of numbers). A further GTRC translation is then performed to map the determined GTRC to an associated primary destination signalling point (and subsystem number). The destination signalling point is in some cases referred to as a "Destination Point Code" (DPC).

A Global Title routing case defines, by way of the destination signalling point, the route via which signalling information is transmitted. Especially during peak calling times, certain routes may become congested with large volumes of signalling traffic. Indeed, it is often the case that when a call is initiated, the primary destination signalling point generated by the GT and GTRC translations associated with the call, is unavailable. In such a situation (and following the broadcast of a congestion message from a given signalling point to neighbouring signalling points), a secondary destination signalling point, defined as a back-up for the primary destination signalling point, is used to route the signalling information. This procedure is described in ITU-T Recommendation Q.714 (Chapter 5).

It will be appreciated that the secondary destination signalling point handles overflow signalling information which the primary destination signalling point is unable to handle. It will also be appreciated that when overflow occurs, the processor(s) at the primary destination signalling point will be working at maximum capacity whilst those at the secondary destination signalling point may be working well below that maximum capacity. It may also happen that the secondary destination signalling point subsequently becomes congested, requiring the transfer of signalling information back to the primary destination signalling point (if the primary signalling point remains congested, a further switch back to the secondary point may occur, and so on). This switching back and forward between the primary and secondary destination signalling points may result in the loss of signalling information.

SUMMARY OF THE PRESENT INVENTION

It is an object of the present invention to overcome or at least mitigate the disadvantages outlined in the preceding paragraph. In particular, it is an object of the present invention to avoid or mitigate congestion associated with signalling traffic routed by the Signalling Connection and Control Part. It is a further object of the present invention to provide means by which possible congestion at a signalling point can be predicted, thereby enabling signalling traffic to be diverted away from that signalling point before congestion occurs.

These and other objects are achieved in a first aspect of the invention by defining peak periods during which heavy signalling traffic is expected. During these peak periods, a proportion of the Global Titles normally allocated to a given destination signalling point are automatically reallocated to an alternative destination signalling point. The peak periods are defined on the basis of the history of congestion notification messages issued by the given signalling point.

According to a first aspect of the present invention there is provided a method of routing signalling information at a signalling point of a telecommunications network, the method comprising:

providing a Global Title Routing Case (GTRC) table mapping Global Titles to GTRCs;

allocating to a set of GTRCs a primary and a secondary destination signalling point;

defining at least one time period on the basis of a history of congestion notification messages issued by said primary destination signalling point;

swapping said primary and secondary destination signalling points for a fraction of said set of GTRCs for the duration of said at least one time period;

for a signalling transfer request at the signalling point, mapping the Global Title associated with the request to a GTRC using the GTRC table; and determining the destination signalling point to be used for the request in dependence upon the primary and secondary destination signalling points allocated to the mapped GTRC and signalling point availability.

By carefully selecting said time period(s) to correspond to known peak signalling traffic periods, embodiments of the present invention automatically divert traffic away from the primary destination signalling point without having to wait until congestion of the primary destination signalling point actually occurs. The resulting load sharing reduces the risk of congestion at the primary and secondary destination signalling points. This results in a more optimal use of processor power at the destination signalling points and also reduces the need to transfer signalling traffic from a congested route to a back-up route. Furthermore, as the maximum volume of signalling traffic through a given signalling point is likely to be reduced, the maximum processing power specified for the point (i.e. its "dimensioning") can be reduced, resulting in a considerable cost saving.

It will be understood that the term "Global Titles" encompasses, but is not limited to, calling and called party telephone numbers, subscriber identity number, mobile identification number, and the like. The GTRC table may map Global Titles to GTRCs using Global Title series, i.e. where Global Titles are grouped into series and each series is mapped to a corresponding GTRC.

Preferably, said destination signalling points are Destination Point Codes (DPC) or the like, which DPCs identify signalling points designated to receive the signalling information.

Preferably, at least one time period is defined for every 24 hours period of operation. More preferably, said first period (s) corresponds to a relatively high usage period.

Preferably, congestion notification messages are broadcast by signalling points in the network, when the points become congested. These messages are monitored at other points of the network to create a congestion history for the sending signalling points. On the basis of these histories, a signalling point defines said time period(s). The congestion notification messages may contain a congestion level which may additionally be used by a receiving signalling point to define said time period(s).

Preferably, the method of the present invention is employed in a Signalling Connection and Control Part (SCCP) of a Signalling System no.7 (SS7) network. The congestion notification messages may be SCCP/Subsystem Congested (SSC) messages.

Preferably, said time period(s) is defined dynamically so that they may be moved, or their duration changed, to reflect changing patterns in network traffic. This process may be automatic, or semi-automatic.

The time period(s) may be defined additionally using query messages sent from said signalling point to said primary destination signalling point, where the primary destination signalling point responds to receipt of the query by returning an answer message to the signalling point. Based upon the delay between transmitting the query and receiving the answer, the signalling point is able to estimate the congestion level at the primary destination point and over the intervening signalling link. If such queries are sent at regular intervals, the signalling point is able to supplement the information obtained from the congestion notification messages. In a network employing SCCP, the query message is known as Subsystem Test (SST) whilst the answer message is know as Subsystem Allowed (SSA).

According to a second aspect of the present invention there is provided apparatus for routing signalling information at a signalling point of a telecommunications network, the apparatus comprising:

first memory means for storing a Global Title Routing Case (GTRC) table mapping Global Titles to GTRCs;

second memory means for storing for a set of GTRCs a primary and a secondary destination signalling point;

first signal processing means for swapping said primary and secondary destination signalling points for the duration of a time period defined on the basis of a history of congestion notification messages issued by the primary destination signalling point; and second signal processor means arranged to receive signalling transfer requests and to determine the destination signalling point to be used for the request in dependence upon the primary and secondary destination signalling points allocated to the mapped GTRC and signalling point availability.

Preferably, the apparatus comprises intelligent processing means arranged to respond to changing signalling traffic levels over time, by adapting the duration and position of said time period.

According to a third aspect of the present invention there is provided a Signalling Connection and Control Part (SCCP) for use in a Signalling System no.7 signalling network, the SCCP comprising:

a Global Title Routing Case (GTRC) table mapping Global Titles to GTRCs;

a primary and a secondary destination signalling point allocated to a set of GTRCs;

a definition of at least one time period, said definition being made on the basis of a history of congestion notification messages issued by the primary destination signalling point;

means arranged to swap said primary and secondary destination signalling points for a fraction of said set of GTRCs for the duration of said time period;

means for mapping a Global Title, associated with a signalling transfer request received at the signalling point, to a GTRC using the GTRC table; and means for determining the destination signalling point to be used for the request in dependence upon the primary and secondary destination signalling points allocated to the mapped GTRC and signalling point availability.

According to a fourth aspect of the present invention there is provided a method of determining congestion at a destination signalling point of a telecommunications network, the method comprising:

sending an echo request message from a signalling point to said destination signalling point;

in response to receipt of said echo request message at the destination signalling point, returning to said signalling point an answer message; and determining at the signalling point the delay between sending the echo request message and receiving the answer message, wherein said delay provides an indication of the congestion level at said destination signalling point.

Preferably, said destination signalling point is one of a set of destination signalling points polled by the signalling point. This set may correspond to those destination signalling points in the network where congestion is likely to occur.

Where said signalling point and said destination signalling point(s) use SCCP, the echo request message may be an SCCP/Subsystem Status Test (SST) message whilst the answer message may be a Subsystem Status Allowed (SSA) message. It is noted that this proposal represents a new use for SSC and SSA messages which are normally used for determining the operational status of a remote network node.

Embodiments of the present invention may use a determined echo response delay to dynamically allocate and/or reallocate signalling traffic to destination signalling points, e.g. signalling traffic may be switched from a primary destination signalling point to a secondary destination signalling point if the primary destination signalling point is observed to be becoming congested.

In other embodiments of the invention, echo response delays, or congestion levels derived therefrom, for a destination signalling point are recorded over a period of time and, using this history, peak signalling traffic periods are defined. During such peak periods, signalling traffic may be automatically transferred from the destination signalling point to some other secondary destination signalling point. These periods may be dynamically redefined if the pattern of signalling traffic within the network (and as represented in the congestion histories) changes.

Embodiments of the fourth aspect of the invention may comprise the steps of:

- providing a Global Title Routing Case (GTRC) table mapping Global Titles to GTRCs;
- allocating to each GTRC a primary and a secondary destination signalling point;
- swapping said primary and secondary destination signalling points for a fraction of said GTRCs when the primary destination signalling point is nearing congestion or is predicted to be nearing congestion;
- for a signalling request at the signalling point, mapping the Global Title associated with the request to a GTRC using the GTRC table; and
- determining the destination signalling point to be used for the request in dependence upon the primary and secondary destination signalling points allocated to the mapped GTRC.

According to a fifth aspect of the present invention there is provided apparatus for determining congestion at a destination signalling point of a telecommunications network, the apparatus comprising:

- transmission means for sending an echo request message from a signalling point to a destination signalling point;
- automatic response means for returning to said signalling point an answer message in response to receipt of said echo request message; and
- processing means at the signalling point for determining the delay between sending the echo request message and receiving the answer message, wherein said delay provides an indication of the congestion level at said destination signalling point.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION OF CERTAIN EMBODIMENTS

A conventional Signalling System no.7 (SS7) protocol stack has been described above with reference to FIG. 1. In particular, the Signalling Connection and Control Part (SCCP) has been described including its role in transforming Global Titles (GTs) into Destination Point Codes (DPCs) via Global Title Routing Cases (GTRCs).

Figure 2:
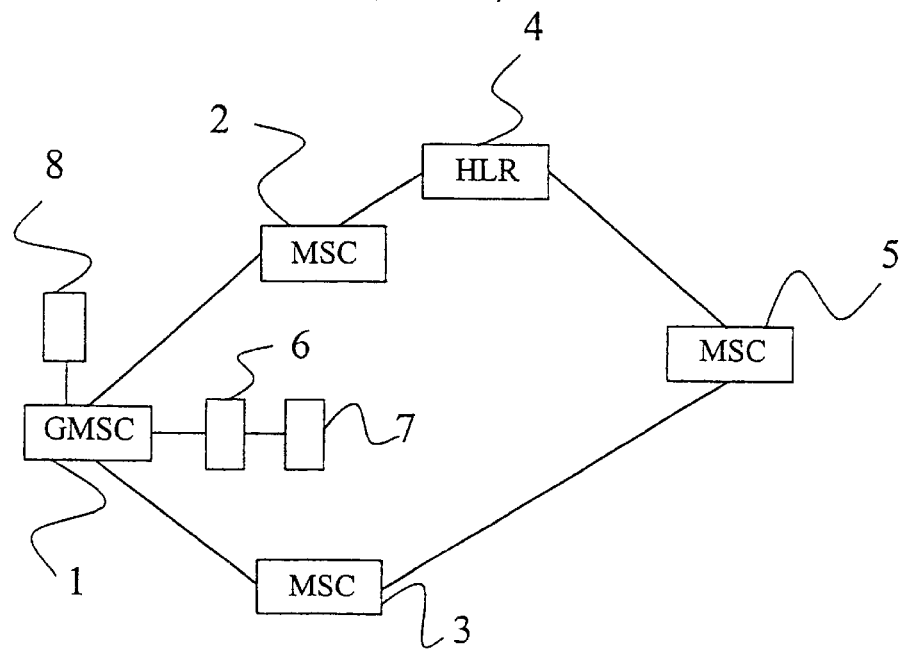
FIG. 2 illustrates schematically a mobile telecommunications network comprising a number of signalling points.

FIG. 2 illustrates a mobile telecommunications network comprising a Gateway Mobile Switching Centre (GMSC) 1 which provides a gateway into and out of the mobile network for "foreign" networks. The GMSC 1 is connected directly to a pair of Mobile Switching Centres (MSCs) 2,3. One of these MSCs 2 is connected directly to a Home Location Register (HLR) 4, whilst the other of the MSCs 3 is connected indirectly to the HLR 4 via a third MSC 5. Each of the MSCs, GMSC, and HLR can be considered a Signalling Point (SP) for signalling traffic being transmitted over the network between peer application or user parts (e.g. ISUPs, TCAPs etc).

Figure 1:
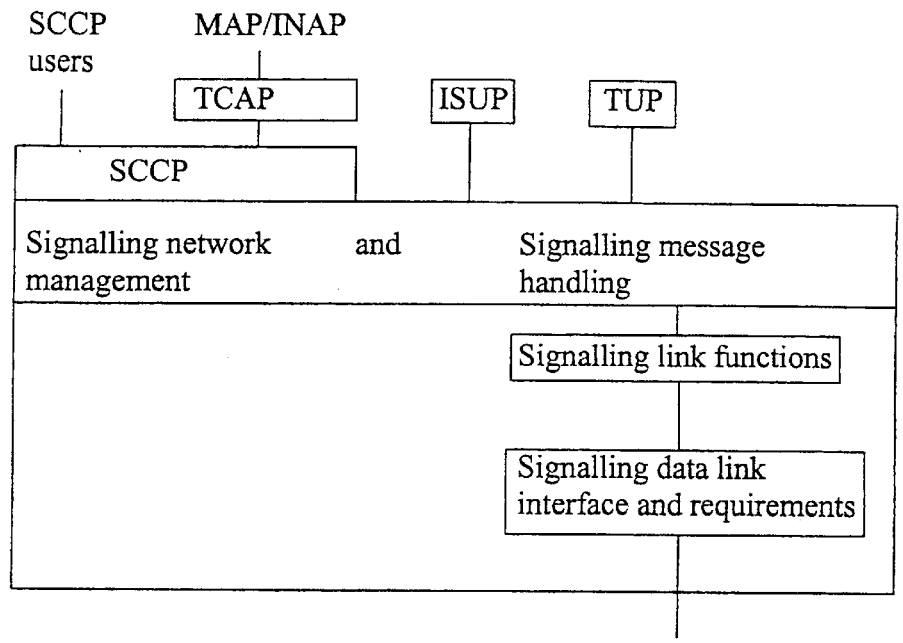
FIG. 1 shows schematically the protocol levels of a Signalling System no.7 signalling network.

Each of the SPs of the network of FIG. 2 comprises a computer/processor programmed to implement the SS7 protocol of FIG. 1. In particular, the SCCP is implemented at each SP for the purpose of routing SCCP messages over the signalling network. As already described above, on the basis of a GT associated with a SCCP message, the SCCP determines the Destination Point Code (DPC) associated with the destination SPC (or a next "hop" SPC in the case where the signalling information is sent to the destination SPC via one or more intermediate SPs).

Considering the case where the GMSC 1 wishes to request information about the status (current location, etc) of a mobile subscriber, a database request must be sent from the GMSC 1 to the HLR 4. From FIG. 2, it will be appreciated that the most direct (and therefore primary) route for the associated signalling information is via the MSC 2, whilst a secondary route is via the MSCs 3 and 5.

A first database 6 (a "GT translation database") associated with the GMSC 1 contains a table mapping GT series to respective GTRCs. Thus, for example, all called party numbers commencing with the digits 123 or 124 are mapped to GTRC 1, all called party numbers commencing with the digits 125 are mapped to GTRC 2, and all called party numbers commencing with the digits 126 are mapped to GTRC 3. A second database 7 (a "GTRC translation" database) maps GTRCs to respective primary and secondary DPCs, e.g. GTRC 1 and 2 are mapped to DPC 1-2-3 (using the network-cluster-member notation) as primary DPC and DPC 1-2-4 as secondary DPC, whilst GTRC 3 is mapped to DPC 1-1-1 as primary DPC and DPC 2-2-2 as secondary DPC. The GT translation GTRC translation databases are illustrated respectively in Tables 1 and 2 below.

Each signalling point of the network is continuously monitoring the signalling traffic which it is handling. In the event that a point becomes congested, it broadcasts to the neighbouring points a congestion notification message known as a SCCP/Subsystem Congested (SSC) message. In conventional systems, receipt of such a message at a signalling point would cause a temporary reconfiguration of the GTRC translation database to occur, such that for certain GTRCs (i.e. those having the congested signalling point as their primary DPC), the primary and secondary DPCs are swapped. However, in the system described here, in addition to this process, SSC messages received at a signalling point are recorded in a congestion history database 8. In this way, each signalling point is able to construct over a period of time a history of the congestion levels occurring at neighbouring points.

On the basis of these histories, a signalling point (or the network operator) is able to identify for each neighbouring signalling point, peak use periods (for a given day) during which that point may be expected to become congested. For example, the operator may define the periods 9am to 10am and 1pm to 2pm as peak traffic periods for a given neighbouring signalling point. Outside of these periods, the computer running the SCCP maintains the GTRC translation database 6 in a given state, with each GTRC being mapped to the usual primary and secondary DPCs. When the signalling traffic is low, it is to be expected that the primary DPCs can handle the traffic without becoming congested. However, if congestion does occur, then the secondary DPC may be used to handle any signalling traffic overflow.

When a peak user period is entered, the computer performs an automatic reconfiguration of the GTRC translation database, such that for certain GTRCS, the primary and secondary DPCs are swapped. For example, and with reference to Table 1 below, the primary and secondary DPCs allocated to GTRC 1 and 3 may remain unchanged during the peak period, whilst for GTRC 2 the normal primary and secondary DPCs are swapped, such that the primary DPC becomes DPC 1-2-4 and the secondary DPC becomes 1-2-3.

Figure 3:
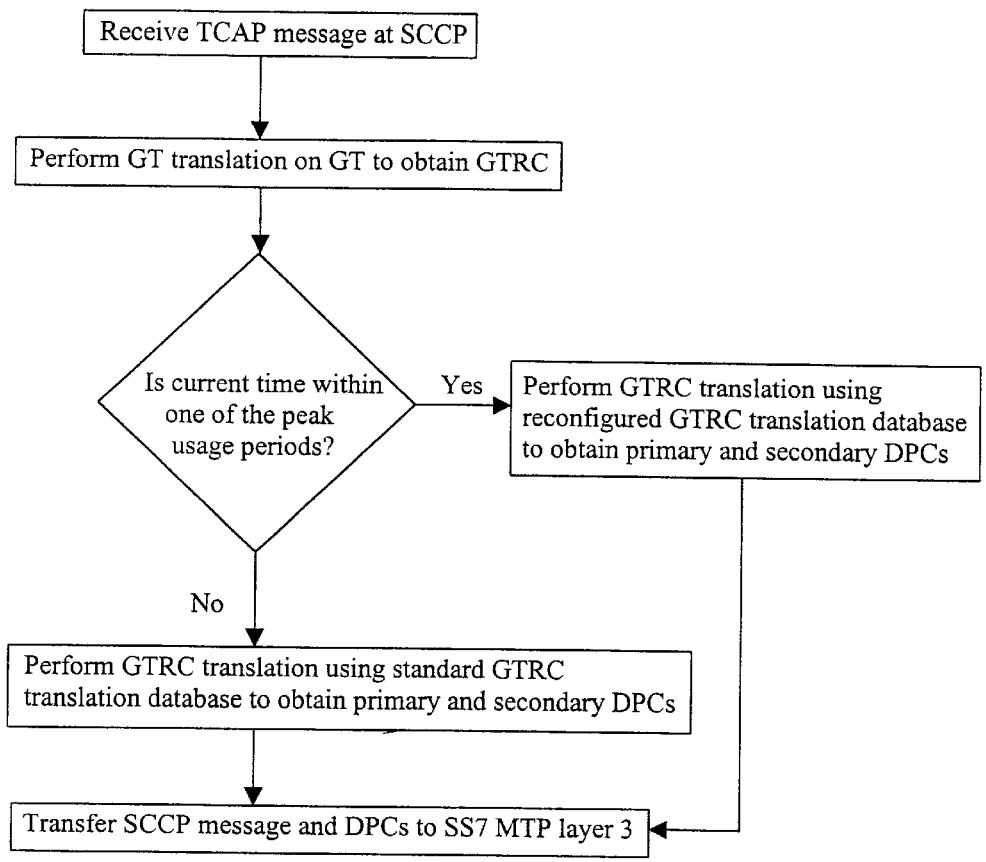
FIG. 3 is a flow diagram illustrating a DPC allocation method in the network of FIG. 2.

Considering the example of FIG. 2, outside of the peak periods, SCCP messages having GTs falling into either one of the 123xxx, 124xxx, or 125xxx series will preferably be routed via the primary route, i.e. via the MSC 2. However, during the peak periods, SCCP messages having GTs falling within the 125xxx series will preferably be transferred via the old secondary route, i.e. via MSCs 3 and 5, whilst SCCP messages having GTs falling within the 123xxx or 124xxx series will continue to be transferred via the primary route. FIG. 3 illustrates this route allocation process by way of a flow diagram.

The route allocation process described above will generally result in a more even distribution or sharing of signalling traffic between signalling routes, as it avoids the need to occupy a given route to its capacity before a reallocation takes place.

In a modification to the embodiment described above, the congestion history database 8 may comprise information derived using answer echo/reply messages (referred to as Subsystem Status Test (SST), and Subsystem Status Allowed (SSA)), where the delay in receiving a reply is a measure of the congestion in the remote signalling point and the congestion in the network.

Figure 4:
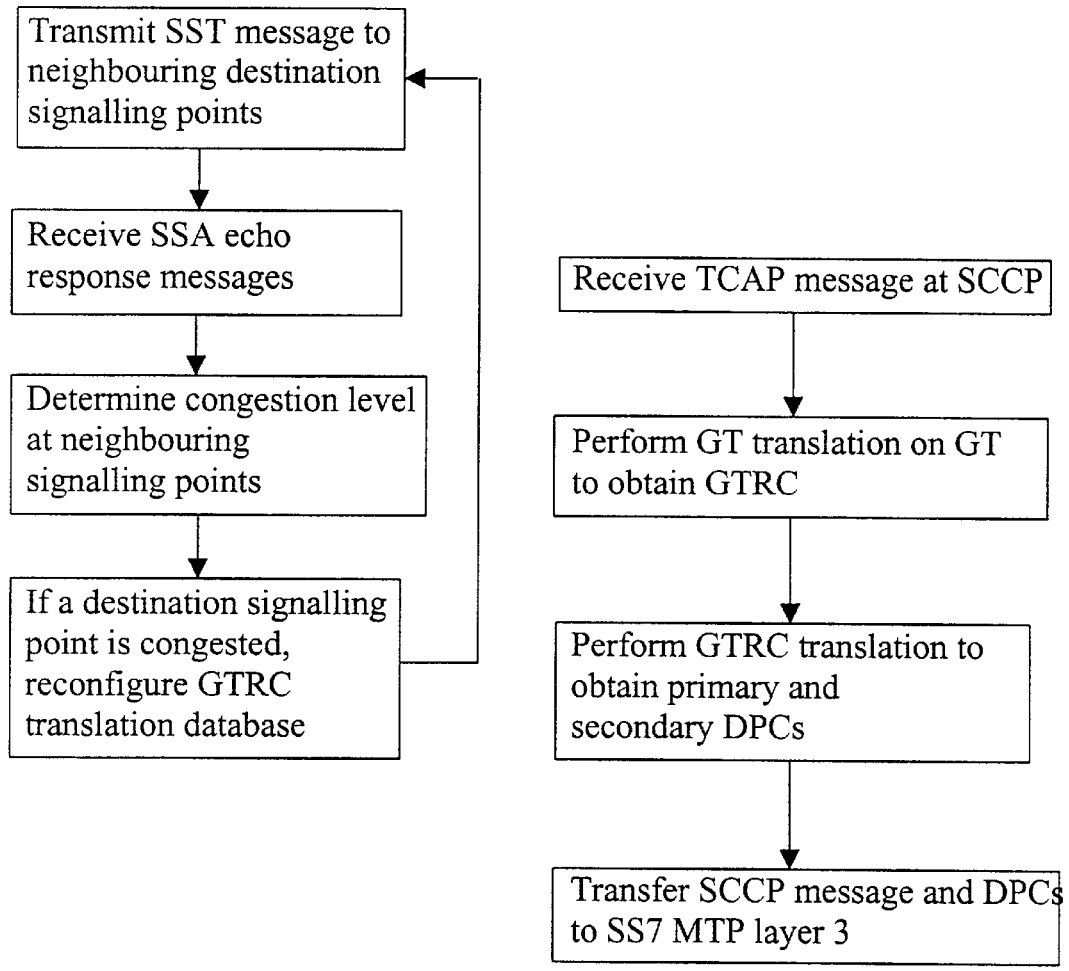
FIG. 4 is a flow diagram illustrating an alternative DPC allocation method in the network of FIG. 2.

The use of SST and SSA messages in determining the congestion level at a signalling point may be applied more generally, e.g. where peak and low signalling traffic periods are not necessarily defined. For example, a signalling point may poll neighbouring signalling points, or at least those likely to become congested, at regular intervals using SST messages. The polling signalling point may react dynamically to receipt of an SSA message from a polled signalling point, and a subsequent determination that the polled signalling point is nearing congestion) to reconfigure the GTRC translation database 7. This process is illustrated in the flow diagram of FIG. 4.

It will be appreciated by the skilled person that various modifications may be made to the above described embodiment without departing from the scope of the present invention. For example, the invention is not limited to SPs of mobile networks but may be applied to any signalling network employing the SCCP. It will also be appreciated that, where the volume of signalling traffic merits it, a GTRC may be mapped to a primary DPC and a plurality of secondary DPCs, i.e. two or more. Alternatively, or in addition, several GTRCs having the same primary DPC, may have different secondary DPCs such that during peak periods signalling traffic can be diverted from the primary DPC to two or more secondary DPCs.

TABLE 1

| Global Title series | GTRC |
|---|---|
| 123xxx | 1 |
| 124xxx | 1 |
| 125xxx | 2 |
| 126xxx | 3 |

TABLE 2

| GTRC | Primary DPC | Secondary DPC | Peak period reconfiguration |
|---|---|---|---|
| 1 | 1-2-3 | 1-2-4 | NO |
| 2 | 1-2-3 | 1-2-4 | YES |
| 3 | 1-1-1 | 2-2-2 | NO |

What is claimed is:

1. A method of routing signalling information at a signalling point of a telecommunications network, the method comprising:
   providing a Global Title Routing Case (GTRC) table mapping Global Titles to GTRCs;
   allocating to a set of GTRCs a primary and a secondary destination signalling point;
   defining at least one time period on the basis of a history of congestion notification messages issued by said primary destination signalling point, wherein said defined at least one time period used for diverting traffic away from possible congestion before congestion occurs;
   swapping said primary and secondary destination signalling points for the duration of said time period;
   for a signalling transfer request at the signalling point, mapping the Global Title associated with the request to a GTRC using the GTRC table; and
   determining the destination signalling point to be used for the request in dependence upon the primary and secondary destination signalling points allocated to the mapped GTRC and signalling point availability.

2. A method according to claim 1, wherein the Global Titles are calling party telephone numbers, called party telephone numbers, subscriber identity numbers, or mobile identification numbers.

3. A method according to claim 1, wherein the GTRC table maps Global Titles to GTRCs using Global Title series.

4. A method according to claim 1, wherein said destination signalling points are Destination Point Codes (DPC), which DPCs identify signalling points designated to receive the signalling information.

5. A method according to claim 1, wherein said at least one time period corresponds to a relatively high usage period.

6. A method according to claim 1, and comprising:
broadcasting congestion notification messages from a destination signalling point when said destination signaling point becomes congested;
monitoring the messages at said signalling point to create a congestion history for the sending destination signalling point; and
defining said said at least one time period on the basis of said history.

7. A method according to claim 6, wherein said congestion notification messages contain a congestion level which is additionally used by the receiving signalling point to define said time period(s).

8. A method according to claim 6, wherein the signalling point and the destination signalling points each comprise a Signalling Connection and Control Part (SCCP) of a Signalling System no. 7 (SS7) network, and the congestion notification messages are SCCP/Subsystem Congested (SSC) messages.

9. A method according to claim 1, wherein said at least one time period is defined dynamically so that it may be moved, or its duration changed, to reflect changing patterns in network traffic.

10. Apparatus for routing signalling information at a signalling point of a telecommunications network, the apparatus comprising:
first memory means for storing a Global Title Routing Case (GTRC) table mapping Global Titles to GTRCs;
second memory means for storing a set of GTRCs, a primary and a secondary destination signalling point;
first signal processing means for swapping said primary and secondary destination signalling points for the duration of a time period defined on the basis of a history of congestion notification messages issued by the primary destination signalling point, wherein said defined at least one time period used for diverting traffic away from possible congestion before congestion occurs, and
second signal processor means arranged to receive signalling transfer requests and to determine the destination signalling point to be used for the request in dependence upon the primary and secondary destination signalling points allocated to the mapped GTRC and signalling point availability.

11. Apparatus according to claim 10 and comprising intelligent processing means arranged to respond to changing signalling traffic levels over time, by adapting the duration and position of said time period.

12. A Signalling Connection and Control Part (SCCP) for use in a Signalling System no. 7 signalling network, the SCCP comprising:
a Global Title Routing Case (GTRC) table mapping Global Titles to GTRCs;
a primary and a secondary destination signalling point allocated to a set of GTRCs;
a definition of at least one first time period, said definition being made on the basis of a history of congestion notification messages issued by the primary destination signalling point, wherein said defined peak signalling traffic periods are used for diverting traffic away from possible congestion before congestion occurs;
means for swapping said primary and secondary destination signalling points for the duration of said time period;
means for mapping a Global Title, associated with a signalling transfer request received at the signalling point, to a GTRC using the GTRC table; and
means for determining the destination signalling point to be used for the request in dependence upon the primary and secondary destination signalling points allocated to the mapped GTRC and signalling point availability.

13. A method of determining congestion at a destination signalling point of a telecommunications network, the method comprising:
sending an echo request message from a signalling point to said destination signalling point, wherein said defined peak signalling traffic periods are used for diverting traffic away from possible congestion before congestion occurs;
in response to receipt of said echo request message at the destination signalling point, returning to said signalling point an answer message; and
determining at the signalling point a delay between sending the echo request message and receiving the answer message, wherein said delay provides an indication of the congestion level at said destination signalling point and over the intervening signalling link and wherein echo response delays, or congestion levels derived therefrom, for a destination signalling point are recorded over a period of time and, using this history, peak signalling traffic periods are defined during which signalling traffic is automatically transferred from the destination signalling point to some other secondary destination signalling point.

14. A method according to claim 13, wherein said destination signalling point is one of a set of destination signalling points polled by the signalling point, the set corresponding to those destination signalling points in the network where congestion is likely to occur.

15. A method according to claim 13, wherein said signalling point and said destination signalling point(s) use SCCP, and the echo request message is an SCCP/Subsystem Status Test (SST) message and the answer message is a Subsystem Status Allowed (SSA) message.

16. A method according to claim 13, and comprising using a determined echo response delay to dynamically allocate and/or reallocate signalling traffic to destination signalling points.

17. A method according to claim 13 and comprising the steps of:
providing a Global Title Routing Case (GTRC) table mapping Global Titles to GTRCs;
allocating to each GTRC a primary and a secondary destination signalling point;
swapping said primary and secondary destination signalling points when the primary destination signalling point is nearing congestion or is predicted to be nearing congestion;
for a signalling transfer request at the signalling point, mapping the Global Title associated with the request to a GTRC using the GTRC table; and
determining the destination signalling point to be used for the request in dependence upon the primary and secondary destination signalling points allocated to the mapped GTRC.

18. Apparatus for determining congestion at a destination signalling point of a telecommunications network, the apparatus comprising:
transmission means for sending an echo request message from a signalling point to a destination signalling point;

automatic response means for returning to said signalling point an answer message in response to receipt of said echo request message; and processing means at the signalling point for determining a delay between sending the echo request message and receiving the answer message, wherein said delay provides an indication of the congestion level at said destination signalling point and over the intervening signalling link, and wherein echo response delays, or congestion levels derived therefrom, for a destination signalling point are recorded over a period of time and, using this history, peak signalling traffic periods are defined during which signalling traffic is automatically transferred from the destination signalling point to some other secondary destination signalling point, wherein said defined peak signalling traffic periods are used for diverting traffic away from possible congestion before congestion occurs.

* * * * *